(12) United States Patent
Lemieux

(10) Patent No.: US 6,283,685 B1
(45) Date of Patent: Sep. 4, 2001

(54) HORIZONTALLY ADJUSTABLE DOWEL PIN HOLE DRILLING GUIDE

(76) Inventor: Raymond A. Lemieux, P.O. Box 697, Claremont, NH (US) 03743

(*) Notice: Subject to any disclaimer, the term of this patent is extended or adjusted under 35 U.S.C. 154(b) by 0 days.

(21) Appl. No.: 09/527,357

(22) Filed: Mar. 17, 2000

(51) Int. Cl.⁷ .................................................... B23B 47/28
(52) U.S. Cl. ...................................... 408/115 R; 408/72 R
(58) Field of Search ........................... 408/72 R, 72 B, 408/115 R, 115 B

(56) References Cited

U.S. PATENT DOCUMENTS

| | | | |
|---|---|---|---|
| 4,492,498 | * | 1/1985 | Kaufman ........................... 408/115 R |
| 5,775,856 | * | 7/1998 | Woodard ........................... 408/115 R |
| 5,954,461 | * | 9/1999 | Lemieux ........................... 408/115 R |

* cited by examiner

Primary Examiner—Steven C. Bishop
(74) Attorney, Agent, or Firm—Kevin Ellicott, Esq.

(57) ABSTRACT

A horizontally adjustable dowel pin hole dri g guide for drilling dowel pin holes into work pieces along various horizontal planes, the horizontally adjustable dowel pin hole driling guide having a stable piece, a pair of swingable and pivotable connectors, the swingable and pivotable connectors being swingably connected to the stable piece, and a horizontally movable piece, the horizontally movable piece being pivotably connected to the swingable and pivotable connectors, the horizontally movable piece have a drill guide passage passing therethrough.

3 Claims, 5 Drawing Sheets

HORIZONTALLY ADJUSTABLE DOWEL PIN HOLE DRILLING GUIDE

CROSS REFERENCE TO OTHER APPLICATIONS

This is the first submission of an application for this article of manufacture. There are no other applications, provisional or non provisional.

FEDERALLY SPONSORED RESEARCH AND DEVELOPMENT

There are no federally sponsored or fimded research or development projects or undertakings in any way associated with the instant invention.

BACKGROUND OF THE INVENTION

1. Field of the Invention

The instant invention relates to that field of devices consisting of articles of manufacture known as dowel pin hole drilling guides. Specifically, the instant invention is an adjustable dowel pin hole dring guide for drilling dowel pin holes along various horizontal planes in a work piece.

2. Background Information

The prior art known to applicant discloses that dowel pin dring guides are relatively well known within the art. These driling guides have ranged from the simple, as embodied in U.S. Pat. No. 2,798,520 issued to J. M. Maskulka on Jul. 9, 1957, to the more complex, as embodied in U.S. Pat. No. 5,954,461 issued to Raymond A. Lemieux on Sep. 21, 1999.

In Maskulka, the primary object of the invention was to create a drill guide which would allow a wood worker to assemble wooden frames without resorting to the traditional mortising of the joints. This was accomplished by creating a device which had an essentially "L" shaped body, the body having two tubular openings, the bore of the tubular openings passing completely through one "leg" of the "L" shaped body. The user of the device would simply lay the wood fame which was to be drilled so that it was cradled by the body, and the tubular openings aligned with the areas of the wood frame which were to be drilled.

This approach worked reasonably well for drilling the flattened ends of wood frames. However, as proposed by Maskulka, it was less than simple to use when drilling the ends of wood frames which were cut on an angle. To drill dowel pin guide holes on an angled end of a wood frame, the user was forced to carefully measure and locate a center line on both pieces of wood. If the center line was off even slightly on either piece, the two pieces would fit together unevenly, thereby negating the device's intended benefit. While this requirement of a carefully located center line applied even to the flat ended wood frame, Applicant believes it was less likely to cause serious errors as a piece of wood frame work which is composed entirely of 90 degree angles as it is much easier hold in place and measure than is one having more or less steep angles.

These limitations were overcome by my prior patent, U.S. Pat. No. 5,954,461 issued to Lenieux on Sep. 21, 1999. In Lemieux '461 the device is composed of a stable piece and a movable piece, the movable piece being pivotably attached to the stable piece such that the movable piece may be adjusted to permit the drilling of dowel pin holes into work pieces which have angled sections, the movable piece being adjusted to follow the angle of the work piece which is to be drilled.

Unfortunately, another inherent limitation of the art typified by Maskulka and present in Lemieux '461 as well was that it was nearly impossible to assure accurate placement of the dowel pin holes to be drilled in various horizontal planes which are not pre-set during manufacture of the devices. So long as the work piece to be drilled was a standard thickness, and the device disclosed by Maskulka was proportioned to that particular thickness work piece, the device worked as described. Furthermore, it is possible in Lemieux '461 to modify the length of the downwardly depending sections of the movable piece through which the attachment channels pass and or vary the placement of the attachment channels along the downwardly depending sections so that work pieces having a different thickness might be drilled. Unfortunately, a modification of this sort is a permanent one which must be made during the manufacture of the device.

In the event that work pieces having thicknesses which differ from one another are to be used, or in the event that the user of the device did not want the dowel pin holes placed along the same horizontal plane (the horizontal plane being dependent upon the distance between the surface of the dowel pin drilling guide device upon which the work piece was located when drilled, and the axis passing through the center of the dowel pin drilling guide hole), neither Maskula nor Lenieux '461 may satisfactorily be employed as the horizontal placement of the axis of each dowel pin guide passage is pre-set during the manufacture of the devices.

A further, and even more serious drawback to the Maskulka device was that it was practically useless when toying to place dowel pins into a wood frame which incorporated compound angles. For example, if one wished to construct a wooden cone using wood strips, it is necessary to include a compound angle along each side to be joined to another wood strip. The device described in the Maskulka patent cannot be used along such compound angles without a great deal of careful measurement and shimming prior to clamping the device to the wood strip. This limitation was overcome by the Lemieux '461 patent which provided a simple and efficient means for drilling dowel pin holes into work pieces having compound angles.

However, while Lemieux '461 permits the drilling of dowel pin holes into work pieces having compound angles, it is essentially just as limited as Maskulka when it comes to drilling dowel pin holes into work pieces of varying thicknesses which include compound angles. Neither Maskulka nor Lemieux '461 provide a simple and efficient means for drilling dowel pin holes into work pieces of varying thicknesses having compound angles or placing dowel pin holes along different horizontal planes in work pieces having compound angles.

Furthermore, Applicant has learned that it is often beneficial to be able to drill multiple dowel pin holes into a work piece along different horizontal planes. That is, even when working on a number of work pieces of identical thicknesses, it may be useful to be able to drill dowel pin holes not only along a horizontal plane which bisects the work piece, but also along various other horizontal planes above and below the bisecting horizontal plane. Maskulka simply cannot do this, and Lenieux '461 can do this in only a limited fashion, the limitation being the precise horizontal placement of the attachment channels, the horizontal location of the dowel pin drilling guide passages and the thickness of the stable piece. Once these three variables have been set during manufacture of the device, drilling along other various horizontal planes cannot be accomplished without a great deal of shimming of the work piece. And while shimming of the work piece is possible, it creates an even greater possibility for misplacement of the dowel pin holes as multiple work pieces are drilled, each requiring accurate and repeated shimming.

Shimming a work piece in order to modify the precise horizontal placement of the dowel pin guide hole is a simple enough matter when drilling only one work piece. However, most projects which require dowel pin holes usually also require that those dowel pin holes be drilled into more than one work piece. For example, when creating a square wood frame to encompass a picture, at least four pieces would be required. Each of these pieces would need to have dowel pin holes drilled into both ends. Therefore, if one were to attempt to drill the dowel pin holes along any horizontal plane other than that pre-set in the prior art devices, one would need to shim each work piece at least twice (once for each end). Furthermore, in order to ensure a proper fit, one would need to be absolutely certain that each work piece was shimmed in exactly the same maimer as each other work piece. Should the shimmy be off even slightly, the dowel pin holes which are drilled would not be properly aligned, necessitating extensive and burdensome surface preparations.

SUMMARY OF THE INVENTION

The instant invention is a horizontally adjustable dowel pin bole drilling guide capable of functioning equally well at various locations along a wooden plank, or similar work piece and providing a means for dring dowel pin drilling guide holes along various horizontal planes, especially when those holes are to be drilled into the angled surface of a work piece. Furthermore, the instant invention may be used drill along various horizontal planes with relative ease even on those articles of differing thicknesses which incorporate compound angles, a feature found nowhere in the prior art.

A first object of the instant invention is to provide a dowel pin hole drilling guide useful for preparing articles for the insertion of dowel pins into a work piece, along different horizontal planes. This object is accomplished through the use of a two piece body comprising a stable piece and a horizontally movable piece, the stable piece and the horizontally movable piece being connected to one another via swingable and pivotable connector means which permit the horizontally movable piece to swing and pivot relative to the stable piece, thus permitting the drilling of dowel pin holes along various horizontal planes in addition to permitting the drilling of dowel pin holes into a work piece at multiple angles.

A second object of the invention is to permit the drilling of dowel pin holes along different horizontal planes into articles which incorporate compound angles. This is accomplished by swingably and pivotably connecting the two pieces of the body together such that the two pieces may be horizontally adjusted relative to one another. This permits drilling of dowel pin holes into the article, at any angle between 44 degrees and 90 degrees, along a wide range of user determined horizontal planes.

A third object of the invention is to permit the drilling of dowel pin holes along different horizontal planes into articles having varying thicknesses, whether compound angles are involved or not. This is accomplished by connecting the horizontally movable piece of the body to the stable piece of the body with swingable and pivotable connector means which permit the horizontally movable piece to be adjustable along a wide range of horizontal planes which may be determined by the user rather than be limited to those horizontal planes pre-set during manufacturing of the device.

It will also be recognized that whether a butt joint, a corner joint (such as a 45 degree corner) or a compound angle joint is to be created, use of the instant invention allows the user of the device to determine the precise horizontal plane in which the dowel pin guide hole will be located while at the same time ensuring that the mated edges of the work piece to be joined will be flush with one another, thus reducing the time required to file and sand the adjoining edges in order to create flush surfaces along the joint.

A DESCRIPTION OF THE DRAWINGS

A DESCRIPTION OF THE PREFERRED EMBODIMENT

Figure 1:
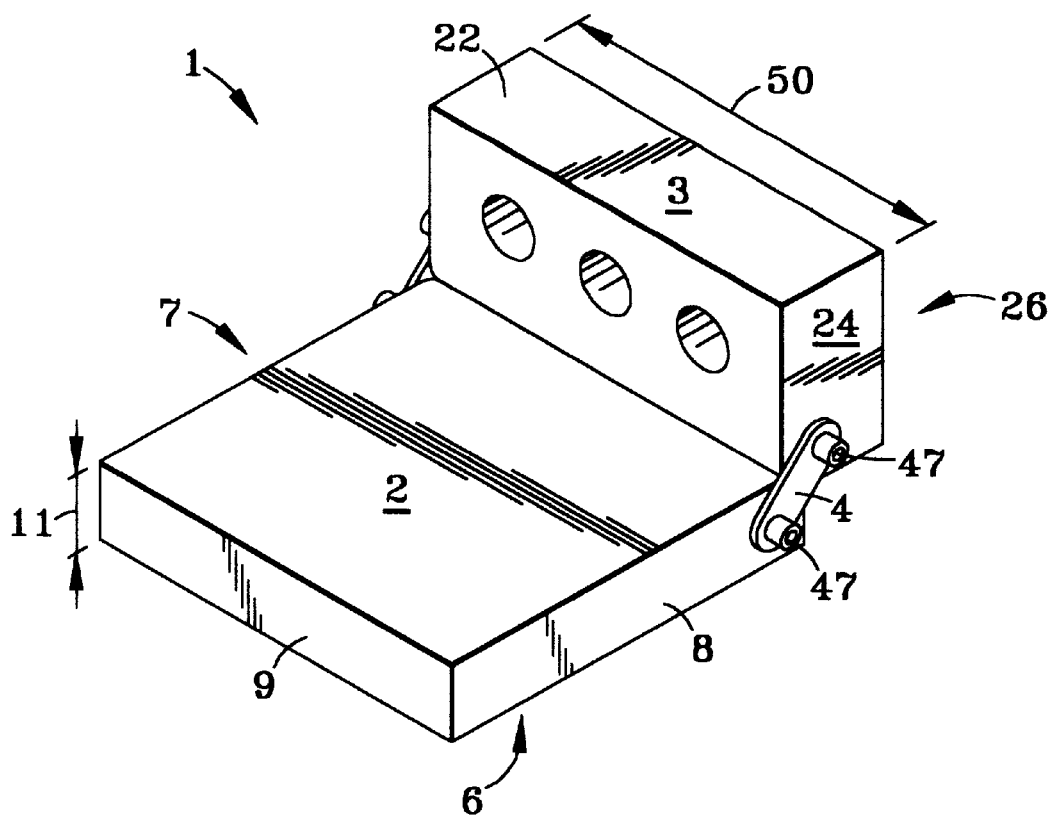
FIG. 1 is a perspective view of the present invention.

As per FIG. 1, the instant invention is body (1) constructed of a stable piece (2) and a horizontally movable piece (3), the horizontally movable piece being both swingably and pivotably attached to the stable piece by swingable and pivotable connector means (4).

In the preferred embodiment, the stable piece is essentially a somewhat flattened rectangular box. Applicant prefers the stable piece to be fabricated from a solid piece of aluminum stock, though other materials will work equally well, so long as once assembled, the stable piece will not bend or warp during use.

Figure 2:
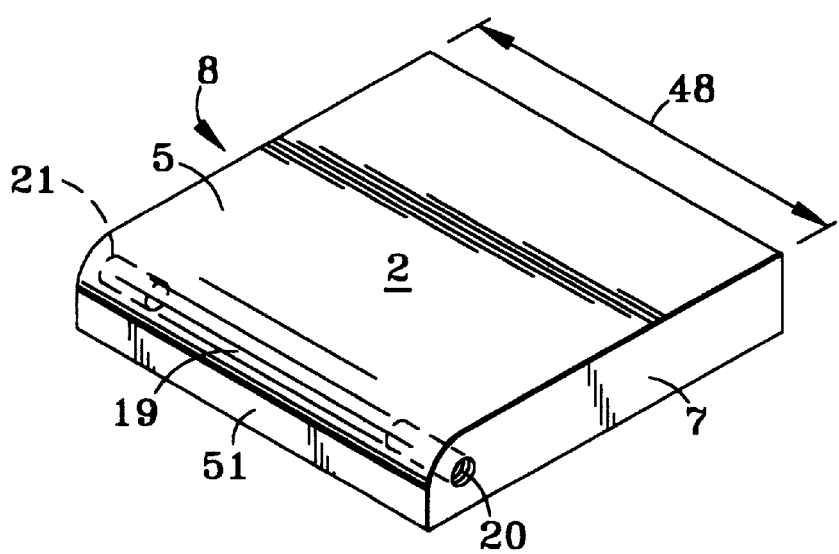
FIG. 2 is a perspective view of the stable piece of the instant invention.

As per FIGS. 1 and 2, like any other rectangular box, the stable piece (2) has a first top surface (5), a first bottom surface (6), a first side surface (7), a second side surface (8), a third side surface (9) and a fourth side surface (51). The first top surface (5) and the first bottom surface (6) are parallel to, though not co-planar with, one another. The first side surface (7) and the second side surface (8) are parallel to, though not co-planar with, one another as well as being perpendicular to both the first top surface (5) and the first bottom surface (6). The third side surface (9) and the fourth side surface (51) are parallel to, though not co-planar with, one another as well as being perpendicular to the first side surface, the second side surface, the first top surface and the first bottom surface. The first top surface (5) is attached to the first side surface (7), the second side surface (8) and the third side surface (9). The first bottom surface (6) is attached to the first side surface (7), the second side surface (8), the third side surface (9) and the fourth side surface (51).

Figure 8:
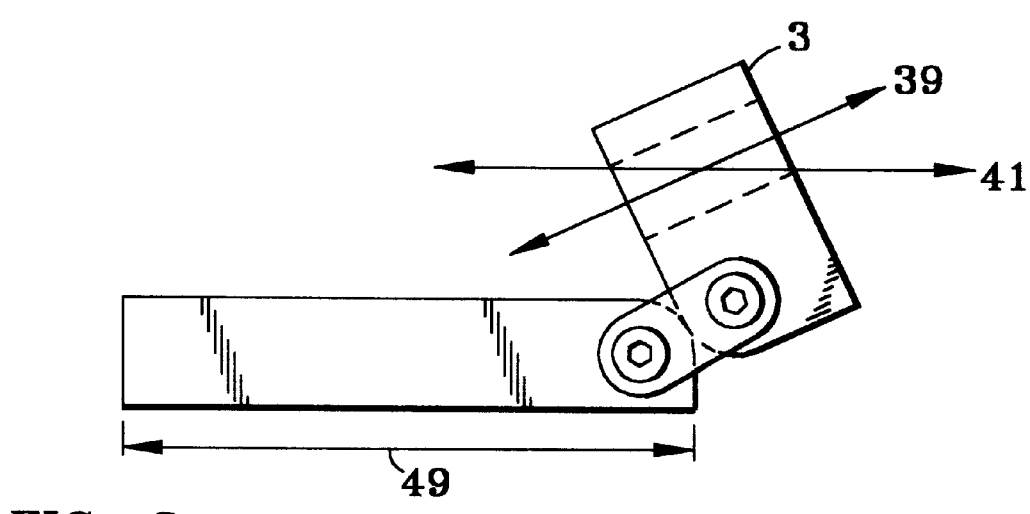
FIG. 8 is side elevational view of the instant invention in the dowel pin guide hole middle position with the horizontally movable piece at an angle.
Figure 9:
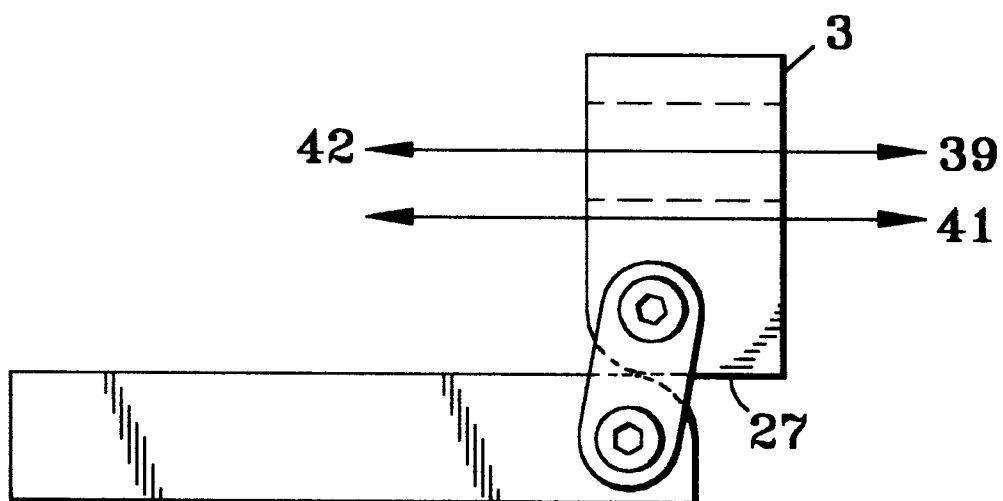
FIG. 9 is side elevational view of the instant invention in the dowel pin guide hole highest position.
Figure 10:
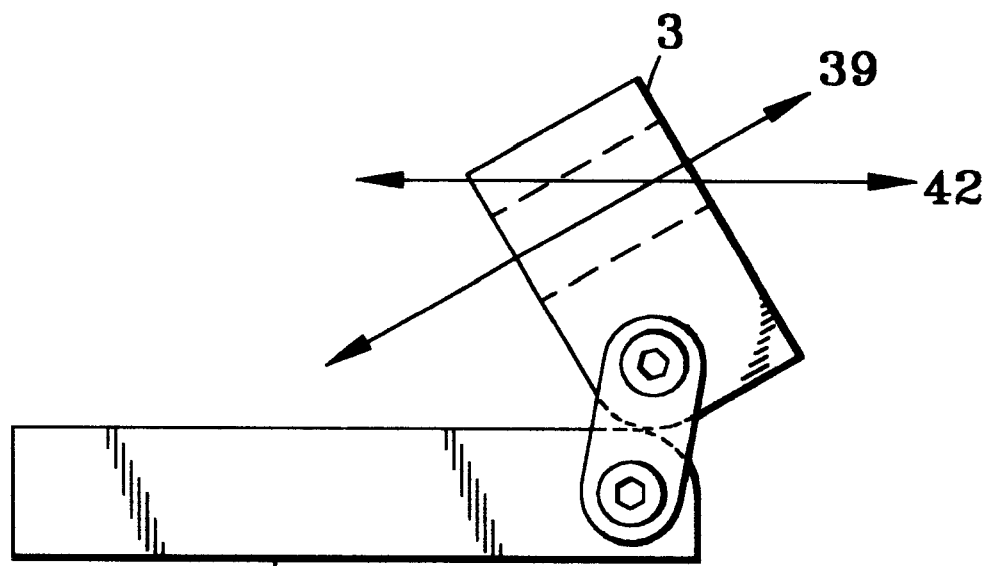
FIG. 10 is side elevational view of the instant invention in the dowel pin guide hole highest position with the horizontally movable piece at an angle.

The stable piece (1) has stable piece thickness which is equal to a third side surface height (11). Naturally, the second side surface (8) and the first side surface (7) each also have a height. The third side surface height (11) and the height of the second side surface and first side surface are all equal to one another. The fourth side surface has a height which is less than the third side surface height. The stable piece further has stable piece width (48). In the preferred embodiment, the stable piece width is 2 and ⅝ inches. Obviously, as per FIG. 8, in addition to stable piece width and height, the stable piece has stable piece length (49). In the preferred embodiment, the stable piece length is 2 and ⅝ inches. However, the stable piece height, width and length may be less than or greater than that disclosed in the preferred embodiment, so long as the dimensions are great enough to support the work piece while drilling dowel pin holes into the work piece.

In order to permit the instant invention to function efficiently, Applicant includes a radiused surface (19), thus providing the stable piece with a curved surface with which to contact the horizontally movable piece (3). The radiused surface will be understood by those familiar with the art by stating that the end of the stable piece which is opposite and most distal from the third side surface (9) is radiused such that the first top surface (5) meets and merges into the radiused surface (19), the radiused surface curving downwardly, out of the horizontal plane the first top surface occupies, meeting with and merging into the fourth side surface (51).

It has been noted above that the stable piece is essentially rectangular in form In a true rectangle, each of the sides would be at a 90 degree angle (or right angle) to each adjacent side. While this holds true for the relationships of the first side, second side, third side, fourth side, first top surface and first bottom surface, it obviously does not hold true for the radiused surface. In the preferred embodiment, the radiused surface is radiused at ¼ of one inch.

The instant invention has been described as having the stable piece (2) to which the horizontally movable piece (3) is swingably and pivotably connected. In the preferred embodiment, Applicant accomplishes the swingable and pivotable attachment by including the swingable and pivotable connector means (4).

Clearly, when the swingable and pivotable connector means is utilized to accomplish the swingable and pivotable connection of the stable piece (2) to the horizontally movable piece (3), there must be a means for attaching the swingable and pivotable connector means (4) to both the stable piece (2) and the horizontally movable piece (3). This is easily accomplished using a wide variety of the swingable and pivotable connector attachment means (47) including, but not limited to screws and bolts.

In the best mode known to Applicant, the simplest way to facilitate the attachment of the swingable and pivotable connector means (4) to the stable piece (2) is to include on the stable piece, as per FIGS. 1 and 2, a first swingable and pivotable connector means attachment hole (20) and an oppositely aligned second swingable and pivotable connector means attachment hole (21). The first swingable and pivotable connector means attachment hole (20) passes through the first side surface (7) and extends into the stable piece (1). The second swingable and pivotable connector means attachment hole (21) passes through the second side surface (8) and extends into the stable piece (2). In the preferred embodiment, the first swingable and pivotable connector means attachment hole and the second swingable and pivotable connector means attachment hole (21) are both tapped and threaded holes, which share a common longitudinal axis (that is, are co-axial with one another), the common axis being parallel to, though not co-planar with, the first top surface (5) the first bottom surface (6), and the third side surface (9) as well as being perpendicular to the first side surface (7).

In the preferred embodiment, Applicant locates the first swingable and pivotable connector means attachment hole (20) on the first side surface (7), approximately vertically midway between the first top surface (5) and the first bottom surface (6). That is, at approximately the one half of the stable piece thickness, and proximate to the end of the stable piece at which the radiused surface (19) is located.

As was noted above, the second swingable and pivotable connector means attachment hole is located oppositely to the first swingable and pivotable connector means hole. Therefore, In the preferred embodiment, Applicant locates the second swingable and pivotable connector means attachment hole (21) on the second side surface (8), approximately vertically midway between the first top surface (5) and the first bottom surface (6). That is, at approximately the one half of the stable piece thickness, and proximate to the end of the stable piece at which the radiused surface (19) is located.

Those skilled in the art will intermediately recognize that the precise placement of first swingable and pivotable connector means hole along the first side surface (7) and the second swingable and pivotable connector means hole along the second side surface may be varied when modifying the dimensions of the stable piece (2), the horizontally movable piece (3) and the swingable and pivotable connector means (4), so long as once completely assembled, the stable piece (2) and the horizontally movable piece (3), may swing and pivot in relation to one another without binding against one another.

Figure 3:
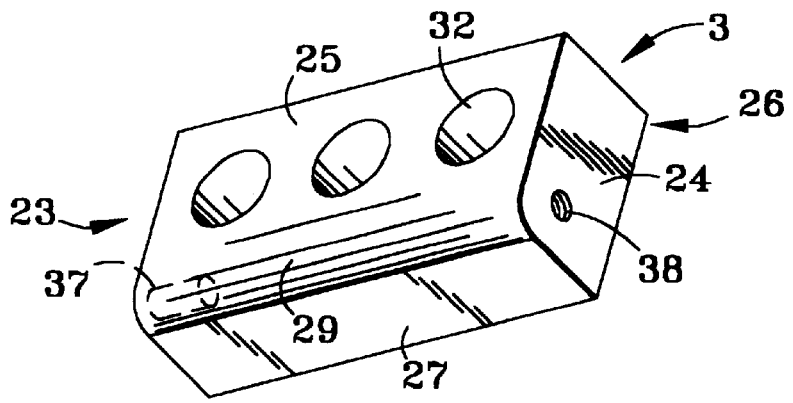
FIG. 3 is a perspective view of the horizontally movable piece of the instant invention.

As per FIGS. 1 and 3, the instant invention further has the horizontally movable piece (3). The overall form of the horizontally movable piece is essentially identical to the overall form of the stable piece (2). That is, like the stable piece (2), the horizontally movable piece is also a three dimensional rectangular box having a radiused surface. Unlike the stable piece (2), however, the horizontally movable piece also includes the dowel pin hole drill guides. The horizontally movable piece has a horizontally movable piece width (50). In the preferred embodiment, the horizontally movable piece width is equal to the stable piece width (48).

As per FIGS. 1 and 3, the horizontally movable piece has a second top surface (22), an eighth side surface (23), a ninth side surface (24), a first front surface (25), the first front surface having a first front surface radiused portion (29), a first rear surface (26), and a second bottom surface (27).

The second top surface (22) is attached to the eighth side surface (23), the ninth side surface (24), the first front surface (25) and the first rear surface (26). The second top surface is perpendicular to the eighth side surface (23) and the ninth side surface (24). The second top surface is also perpendicular to the first front surface (25) and the first rear surface (26).

The eighth side surface (23) is attached to the second top surface (22), the first front surface (25), the first rear surface (26) and the second bottom surface (27). The eighth side surface (23) is perpendicular to the second top surface (22), the first front surface (25) the first rear surface (26) and the second bottom surface (27).

The ninth side surface (24) is attached to the second top surface (22), the first front surface (25), the first rear surface (26) and the second bottom surface (27). The ninth side surface (24) is perpendicular to the second top surface (22), the first front surface (25) the first rear surface (26) and the second bottom surface (27).

The first front surface (25) is attached to the second top surface (22) the eighth side surface (23) the ninth side surface (24) and the second bottom surface (27). The first front surface is perpendicular to the eighth side surface (23) and the ninth side surface (24).

As was noted above, the first front surface includes a first front surface radiused portion. The first front surface radiused portion (29) will be understood by those familiar with the art by stating that when the instant invention is fully assembled, the end of the horizontally movable piece which is opposite and most distal from the top side surface (22), and most proximate to the stable piece radiused surface (19) is radiused such that the first front surface (25) meets with and merges into the second bottom surface (27).

Again, as with the stable piece, it has been noted above that the horizontally movable piece is essentially rectangular in form. In a true rectangle, each of the sides would be at a 90 degree angle (or right angle) to each adjacent side. While this holds true for the relationships of the eighth side, ninth side, fist rear surface, second top surface and second bottom surface, it obviously does not hold true for the radiused portion of the first front surface. In the preferred embodiment, the first front surface radiused portion (29) is radiused at ¼ of one inch. Applicant prefers the horizontally movable piece to be fabricated from a solid piece of aluminum stock, though other materials will work equally well, so long as once assembled, the horizontally movable piece will not bend or warp during use.

As was noted above, in the best mode known to Applicant, the simplest way to facilitate the attachment of the swingable and pivotable connector means (4) to the stable piece (2) was to include on the stable piece, as per FIGS. 1 and 2, a first swingable and pivotable connector means attachment hole (20) and an oppositely aligned second swingable and pivotable connector means attachment hole (21). Naturally, a connection must be made between the swingable and pivotable connector means (4) and the horizontally movable piece (3). Applicant accomplishes this connection by including on the horizontally movable piece a third swingable and pivotable connector means attachment hole (37) and an oppositely aligned fourth swingable and pivotable connector means attachment hole (38).

As per FIGS. 1 and 3, the third swingable and pivotable connector means attachment hole (37) passes through the eighth side surface (23) and extends into the horizontally movable piece (3). The fourth swingable and pivotable connector means attachment hole (38) passes through the ninth side surface (24) and extends into the horizontally movable piece (3). In the preferred embodiment, the third swingable and pivotable connector means attachment hole (37) and the fourth swingable and pivotable connector means attachment hole (38) are both tapped and threaded holes, which share a common axis (that is, are co-axial with one another), the common axis being parallel to, though not co-planar with, the second top surface (22) the second bottom surface (27), and the first front surface (25) as well as being perpendicular to the eighth side surface (23).

In the preferred embodiment, Applicant locates the third swingable and pivotable connector means attachment hole (37) on the eighth side surface (23), proximate to the first front surface radiused portion (29).

As was noted above, the fourth swingable and pivotable connector means attachment hole (38) is located oppositely to the third swingable and pivotable connector means hole (37). Therefore, In the preferred embodiment, Applicant locates the fourth swingable and pivotable connector means attachment hole (38) on the ninth side surface (24), proximate to the first front surface radiused portion (29).

Those skilled in the art will immediately recognize that, just as with the first swingable and pivotable connector means hole (20) and the second swingable and pivotable connector means hole (21), the precise placement of third swingable and pivotable connector means hole along the eight side surface (23) and the fourth swingable and pivotable connector means hole along the ninth side surface (24) may be varied when modifying the dimensions of the stable piece (2), the horizontally movable piece (3) and the swingable and pivotable connector means (4), so long as once completely assembled, the stable piece (2) and the horizontally movable piece (3), may swing and pivot in relation to one another without binding against one another.

As per FIGS. 1 and 3, the horizontally movable piece has at least one drill guide passage (32) passing therethrough. In the preferred embodiment, the drill guide passage (32) is a hole passing through the first front surface (25), completely through the horizontally movable piece, and through the first rear surface (26). Applicant believes that the stability of the instant invention is enhanced when the drill guide hole passes through a flattened section of the first font surface (25) rather than passing through the radiused portion (29). Furthermore, the axis of the drill guide passage should be parallel to the second top surface (22) The drill guide passage (32) must be sized and shaped such that a drill bit may pass in through the hole located on the first rear surface (26), pass completely through the horizontally movable piece, and pass out through the first front surface (25). In the preferred embodiment, Applicant includes three drill guide passages, however, this is not required. It will also be obvious to those skilled in the art that the drill guide passage may have a diameter sized for acceptance of differing dimensions of drill bits. For example, should one wish the instant invention to be used in conjunction with drill bits having a diameter of ¼ of one inch, the drill guide passages may be sized such that they are large enough for a ¼ of one inch diameter drill bit to pass therethrough, but not so large as to allow a ⅜ of one inch diameter drill bit to pass therethrough. Clearly, the instant invention may be fabricated having different sized drill guide passages for use with different sized drill bits.

Figure 4:
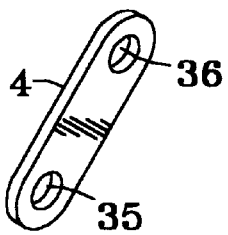
FIG. 4 is a perspective view of the swingable and pivotable connector means.
Figure 5:
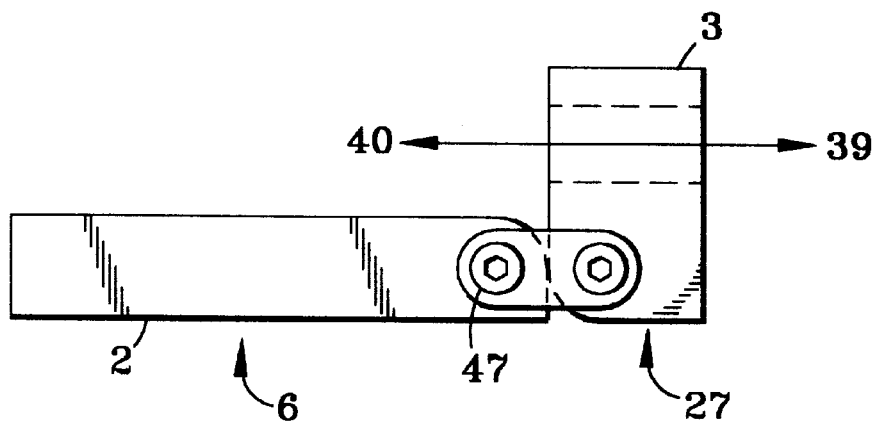
FIG. 5 is side elevational view of the instant invention in the dowel pin guide hole lowest position.
Figure 6:
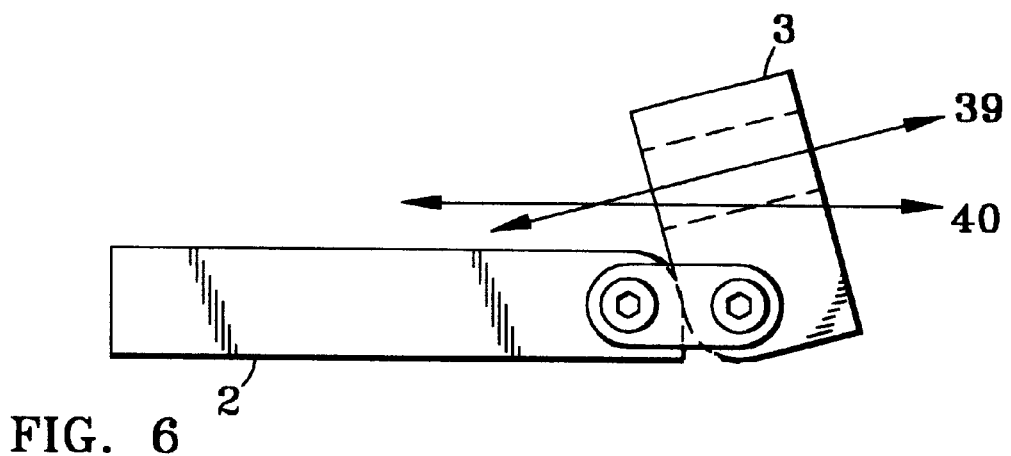
FIG. 6 is side elevational view of the instant invention in the dowel pin guide hole lowest position with the horizontally movable piece at an angle.

Finally, as was noted above, the horizontally movable piece (3) is swingably and pivotably attached to the stable piece (2) by swingable and pivotable attachment means (4). A total of two identical swingable and pivotable attachment means are used with the instant invention. For understanding's sake, these may be referred to as a first swingable and pivotable attachment means and a second swingable and pivotable attachment means. As per FIG. 4, the swingable and pivotable attachment means is preferably simply a link having a first hole (35) and a second hole (36) passing completely therethrough as the swingable and pivotable attachment means. The link is simply a flattened oval shaped piece of metal or other si material which is sufficiently strong and sturdy such that when the instant invention is being used to drill guide holes into work pieces, the swingable and pivotable attachment means will not tend to bend, break, warp or become distorted. In the preferred embodiment, the swingable and pivotable attachment means is fabricated from steel.

Assembly of the instant invention may now be better understood. As per FIGS. 1, 2, 3 and 4, the horizontally movable piece (3) is swingably and pivotably attached to the stable piece (2) by the first and second swingable and pivotable connector means (4). The pair of swingable and pivotable connector means are identical to one another. Applicant accomplishes the swingable and pivotable attachment by placing the first swingable and pivotable connector means in contact with the horizontally movable piece ninth side surface (24) such that the second hole (36) of the first swingable and pivotable connector means (4) is aligned co-axially with the fourth swingable and pivotable connector means attachment hole (38). It has been noted that the swingable and pivotable connector attachment means (47) is utilized to secure the swingable and pivotable connector means (4) to the stable piece (2) and the horizontally movable piece. In the preferred embodiment, the swingable and pivotable connector attachment means (47) is a threaded bolt sized for snug removable insertion into the various swingable and pivotable connector means holes. A total of four such swingable and pivotable connector attachment means (47) are utilized when assembling the instant invention. Applicant prefers all four swingable and pivotable attachment means to be identical to one another. For understanding's sake, these may be referred to as a first swingable and pivotable attachment means, a second swingable and pivotable attachment means, a third swingable and pivotable attachment means and a fourth swingable and pivotable attachment means.

Applicant inserts the fourth swingable and pivotable connector attachment means (47) through the first swingable and pivotable connector means second hole (36) and into the fourth swingable and pivotable connector means attachment hole (38), threadably engaging the fourth swingable and pivotable connector attachment means into the fourth swingable and pivotable connector means attachment hole (38). Applicant repeats this process on the other side of the instant invention by placing the second swingable and pivotable connector means in contact with the horizontally movable piece eighth side surface (23) such that the second hole (36) of the swingable and pivotable connector means is aligned co-axially with the third swingable and pivotable connector attachment hole (37). Applicant then inserts the third swingable and pivotable connector attachment means (47) through the swingable and pivotable connector means second hole (36) and into the third swingable and pivotable connector attachment hole (37), threadably engaging the third swingable and pivotable connector attachment means (47) into the third swingable and pivotable connector attachment hole (37).

Next, Applicant attaches the swingable and pivotable connector means (4) directly to the stable piece (2). Applicant accomplishes the swingable and pivotable attachment of the stable piece by placing the first swingable and pivotable connector means in contact with the stable piece second side surface (8) such that the first hole (35) of the first swingable and pivotable connector means (4) is aligned co-axially with the second swingable and pivotable connector means attachment hole (21). Applicant then inserts the second swingable and pivotable connector attachment means (47) through the swingable and pivotable connector means first hole (35) and into the second swingable and pivotable connector means attachment hole (21), threadably engaging the second swingable and pivotable connector attachment means into the second swingable and pivotable connector means attachment hole (21). Applicant repeats this process on the other side of the instant invention by placing the second swingable and pivotable connector means in contact with the stable piece first side surface (7) such that the first hole (35) of the second swingable and pivotable connector means is aligned co-axially with the first swingable and pivotable connector attachment hole (20). Applicant then inserts the first swingable and pivotable connector attachment means (47) through the second swingable and pivotable connector means first hole (35) and into the first swingable and pivotable connector attachment hole (20), threadably engaging the swingable and pivotable connector attachment means into the first swingable and pivotable connector attachment hole (20).

As per FIGS. 5, 6, 7, 8, 9 and 10, the swingable and pivotable attachment of the horizontally movable piece to the stable piece having been accomplished, the operation of the instant invention may now be better understood.

The instant invention may be assembled such that the dowel pin guide hole is set in its lowest position For simplicity's sake, the dowel pin guide hole lowest position may be described as the position where the stable piece (2) is placed on a work surface (such as a table or bench) so that the stable piece first bottom surface (6) is in direct contact with the work surface, and the horizontally movable piece (3) is oriented such that the horizontally movable piece second bottom surface is also in contact with the work surface. When configured in this fashion, a longitudinal axis (39) passing through the dowel pin guide hole (32) will be located in a first horizontal plane (40), the first horizontal plane being parallel to, though not co-planar with, the stable piece first top surface (5) and the horizontally movable piece second top surface (22).

When the instant invention is set in the dowel pin guide hole lowest position, one may place a work piece so that it is in direct contact with the stable piece first top surface (5) and the horizontally movable piece first front surface (25) and then insert a drill bit through the dowel pin guide hole in order to drill a dowel pin guide hole into the work piece.

However, should one wish to drill that dowel pin guide hole into a work piece that has an angled surface, one need only pivot the horizontally movable piece. As per FIG. 6, the instant invention is still set in its dowel pin guide hole lowest position, however, the horizontally movable piece has been adjusted such that the dowel pin guide hole longitudinal axis (39) is now at an acute angle relative to the first horizontal plane (40). Adjustment of the horizontally movable piece is easily accomplished by simply loosening the third swingable and pivotable connector attachment means and the fourth swingable and pivotable connector attachment means, pivoting the horizontally movable piece relative to the stable piece, and then re-tightening the swingable and pivotable connector attachment means.

Figure 7:
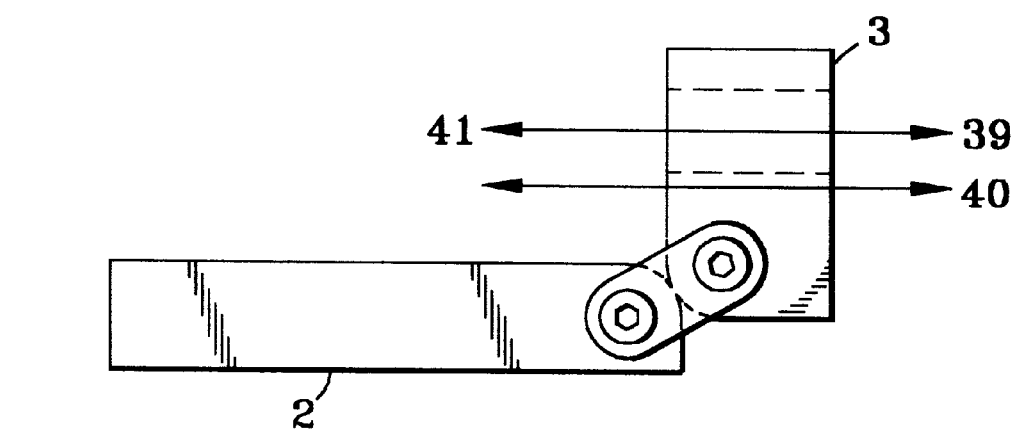
FIG. 7 is side elevational view of the instant invention in the dowel pin guide hole middle position.

Next, in the even that one wishes to drill a dowel pin guide hole into a work piece which is thicker than the work piece described above, or should one wish to drill a dowel pin guide hole in a work piece of the same thickness as the work piece described above, but have the dowel pin guide hole placed in a horizontal plane above the first horizontal plane, then one need only swing the horizontally movable piece into a different position As per FIG. 7, the horizontally movable piece may be moved out of the so-called dowel pin guide hole lowest position and into a middle position. This is easily accomplished by loosening the all four of the swingable and pivotable connector attachment means (47) which threadably engaged into both the stable piece (2) and the horizontally movable piece (3) and swinging the horizontally movable piece upwardly, away from the work surface upon which the stable piece sits, such that the dowel pin guide hole longitudinal axis (39) now sits in a second horizontal plane (41), the second horizontal plane being located above the first horizontal plane (40). Next, one re-tightens all four of the swingable and pivotable connector attachment means (47) with the horizontally movable piece set in the new position. Those skilled in the art will immediately recognize that the instant invention, through its horizontal adjustability, may be used to drill dowel pin guide holes into a wide variety of different horizontal planes, a accomplishment unknown in the prior art.

Having swung the horizontally movable piece into a new position which makes possible the drilling of dowel pin guide holes along a second horizontal plane (41), one may now additionally modify the angle of the horizontally movable piece relative to the stable piece once again in order to drill dowel pin guide holes into the work piece at an angle. As per FIG. 8, the horizontally movable piece may be adjusted such that the dowel pin guide hole longitudinal axis (39) is at an acute angle relative to the second horizontal plane (41). This is accomplished in the manner set out above, that is, by loosening the third and fourth swingable and pivotable connector attachment means passing into the horizontally movable piece, pivoting the horizontally movable piece relative to the stable piece, and then retightening the third and fourth swingable and pivotable connector attachment means which pass into the horizontally movable piece.

Finally, for understanding's sake, one may set the horizontally movable piece into the dowel pin guide hole highest position. As per FIG. 9, the horizontally movable piece (3) may be swung upwardly into its highest position. This is easily accomplished by loosening the swingable and pivotable connector attachment means (47) which are threadably engaged into both the stable piece (2) and the horizontally movable piece (3) and swinging the horizontally movable piece upwardly, away from the work surface upon which the stable piece sits, such that the dowel pin guide hole longitudinal axs (39) now sits in a third horizontal plane (42), the third horizontal plane being located above the second horizontal plane (41). Next, one re-tightens the swingable and pivotable connector attachment means with the horizontally movable piece set in the new position.

When placed in the dowel pin guide hole highest position, the horizontally movable piece second bottom surface (27) is located above the stable piece (2) such that the second bottom surface (27) is adjacent to the stable piece first top surface (5).

Having swung the horizontally movable piece into a new position which makes possible the drilling of dowel pin guide holes along a third horizontal plane (42), one may now additionally modify the angle of the horizontally movable piece relative to the stable piece once again in order to drill dowel pin guide holes into the work piece at an angle. As per FIG. 10, the horizontally movable piece may be adjusted such that the dowel pin guide hole longitudinal axis (39) is at an acute angle relative to the third horizontal plane (42). This is accomplished in the manner set out above, that is, by loosening the swingable and pivotable connector attachment means passing into the horizontally movable piece, pivoting the horizontally movable piece relative to the stable piece, and then re-tightening the swingable and pivotable connector attachment means which pass into the horizontally movable piece.

It should be clear that while Applicant has described the horizontally movable piece in a dowel pin guide lowest position, a dowel pin guide middle position and a dowel pin guide highest position, the instant invention is capable of being set in a plurality of different positions. The three positions disclosed above are merely for illustrative purposes and obviously should not be taken literally as the only three positions possible. One may easily set the horizontally movable piece in a wide number of different positions relative to the stable piece and thus drill dowel pin guide holes into a work piece in a wide variety of horizontal planes.

It has been noted above that the stable piece radiused surface (19) is radiused at ¼ of one inch. It should be further understood that in the preferred embodiment, the center point (that is, the point from which a radius would be measured, and through which the longitudinal axis would pass) of the first swingable and pivotable connector attachment hole (20) and the center point of the second swingable and pivotable connector attachment hole (21) is ¼ of one inch from the stable piece top surface (2) and ¼ of one inch from the stable piece fourth side surface (51). So too, in the preferred embodiment the horizontally movable piece first front surface radiused portion (29) is radiused at ¼ of one inch. Therefore, in the preferred embodiment, the center point of the third swingable and pivotable connector attachment hole (37) and the center point of the fourth swingable and pivotable connector attachment hole (38) is ¼ of one inch from the horizontally movable piece first front surface (25) and ¼ of one inch from the horizontally movable piece second bottom surface (27). With this in mind, it should be obvious that the distance between the swingable and pivotable connector means first hole (35) and the swingable and pivotable connector means second hole (36), (such distance being measured from the radius center point of swingable and pivotable connector means first hole and the swingable and pivotable connector means second hole) should be equal to the sum of the radius of stable piece radiused surface (19) and horizontally movable piece first front surface radiused portion (29). So long as this relationship is maintained, the swingable and pivotable connector means (4) can act as a floating hinge, permitting the horizontally movable piece to swing in relation to the stable piece as well as pivoting in relation to the stable piece first top surface (2), without allowing the stable piece and the horizontally movable piece to bind against one another. It should be immediately understood that these measurements are given merely to prevent the necessity of undue experimentation by one skilled in the art in order to practice the instant invention. As has been noted, the various measurements provided may be varied so long as the horizontally movable piece may swing in relation to the stable piece and pivot in relation to the stable piece first top surface without binding.

Figure 11:
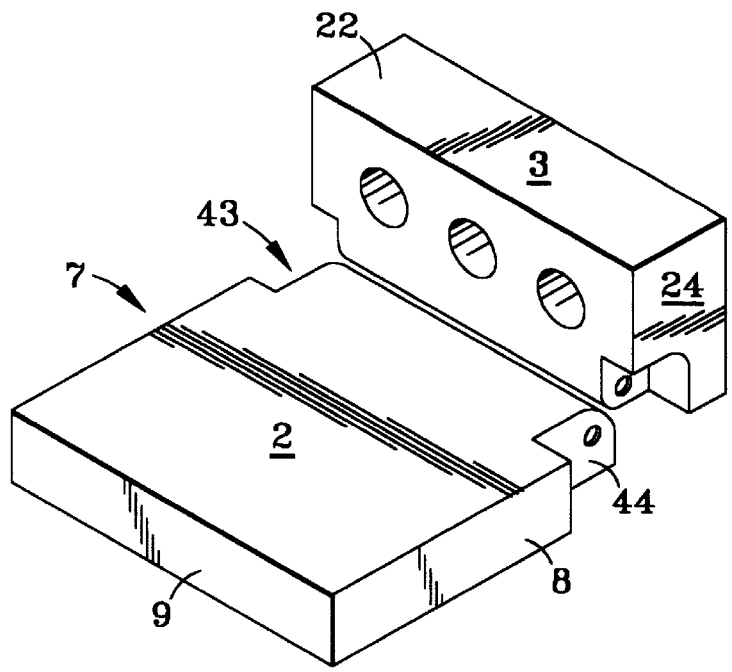
FIG. 11 is a perspective view of the second embodiment of the instant invention.

In a second embodiment of the instant invention, as per FIG. 11, the stable piece (2) and the horizontally movable piece (3) both have cut out areas which allow the swingable and pivotable connector attachment means (47) along with the swingable and pivotable connector (4) to be attached such that they do not stick out when the device is fully assembled. By "stick out", Applicant means that neither the swingable and pivotable connector (4) nor the swingable and pivotable connector attachment means (47) will extend away from the stable piece (2) or the horizontally movable piece (3) beyond a vertical plane defined by the stable piece first side surface (7) and horizontally movable piece eighth side surface (23) and a second vertical plane defined by the stable piece second side surface (8) and the horizontally movable piece ninth side surface (24) when the second embodiment of the instant invention is completely assembled. The cut out areas or depressions give the stable piece (2) a generally truncated "T" shaped appearance.

Figure 12:
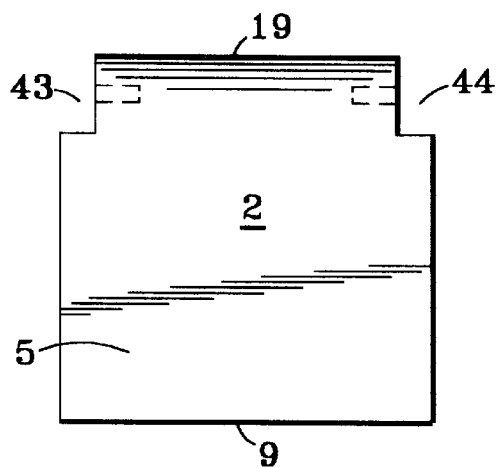
FIG. 12 is an overhead view of the stable piece of the second embodiment of the instant invention.

As per FIGS. 11 and 12, in the second embodiment the stable piece has a first right angle cut out area (43) and an opposite second right angle cut out area (44). The first right angle cut out area is located on the first side surface (7), proximate to the stable piece radiused surface (19) and distant from the stable piece third side surface (9). The opposite second right angle cut out area (44) is located on the second side surface (8), proximate to the stable piece radiused surface (19) and distally from the stable piece third side surface (9). The first right angle cut out area (43) and the second right angle cut out area (44) are parallel to, though not co-planar with, one another. In the second embodiment, the first swingable and pivotable connector attachment hole (20) is located in the first right angle cut out area and the second swingable and pivotable connector attachment hole (21) is located in the second right angle cut out area.

The first right angle cut out area is most simply described by stating that the corner where the first side surface (7) and the radiused surface (19) meet has been removed, thus producing a mirror image "L" shaped right angle cut out when the stable piece is viewed from above, as per FIG. 12. So too, the second right angle cut out area may be most simply described by stating that the corner where the second side surface (8) and the radiused surface (19) meet has been removed, thus producing an "L" shaped right angle cut out area when the stable piece is viewed from above, as per FIG. 12. The first right angle cut out area and the second right angle cut out area are the only differences between the second embodiment of the stable piece and the preferred embodiment of the stable piece.

Figure 13:
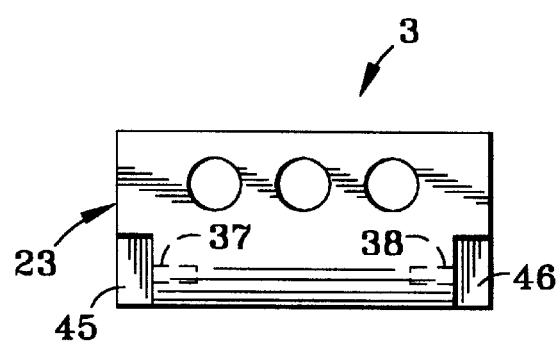
FIG. 13 is a front elevational view of the horizontally movable piece of the instant invention.

As per FIGS. 11 and 13, the horizontally movable piece also has a pair of oppositely aligned radiused cut out areas. The horizontally movable piece (3) has a first radiused cut out area (45) and an opposite second radiused cut out area (46). The first radiused cut out area (45) is located on the horizontally movable piece eighth side surface (23), proximate to the first front surface radiused portion (29) and the second bottom surface (27), and distally from the second top surface (22). The second radiused cut out area (46) is located opposite the first radiused cut out area on the horizontally movable piece ninth side surface (24), proximate to the first front surface radiused portion (29) and the second bottom surface (27), and distally from the second top surface (22). In the second embodiment, the third swingable and pivotable attachment means connector hole (37) is located in the first radiused cut out area (45). So too, in the second embodiment the fourth swingable and pivotable attachment means connector hole (38) is located in the second radiused cut out area (46). The first radiused cut out area (45) and the second radiused cut out area (46) must be of sufficient depth such that when the second embodiment of the instant invention is fully assembled, neither the swingable and pivotable connector (4) nor the swingable and pivotable connector attachment means (47) will extend away from the stable piece (2) or the horizontally movable piece (3) beyond the vertical plane defined by the stable piece first side surface (7) and horizontally movable piece eighth side surface (23) and the second vertical plane defined by the stable piece second side surface (8) and the horizontally movable piece ninth side surface (24) when the second embodiment of the instant invention is completely assembled. Furthermore, Applicant believes that in the second embodiment the cut out areas located on the horizontally movable piece should not be right angle cut outs as are the ones found on the stable piece so that the swingable and pivotable connector means (4) will not bind against the horizontally movable piece when the horizontally movable piece is pivoted relative to the stable piece. The first radiused cut out area and the second radiused cut out area are the only differences between the second embodiment of the horizontally movable piece and the preferred embodiment of the horizontally movable piece.

In the second embodiment of the instant invention, the stable piece is swingably and pivotably attached to the horizontally movable piece by inserting the swingable and pivotable connector attachment means (47) through the swingable and pivotable connector means (4) and into the swingable and pivotable connector means attachment holes. Furthermore, use of the instant invention as described in the second embodiment proceeds in exactly the same manner as does use of the instant invention in the preferred embodiment.

Finally, it has been noted that the horizontally movable piece has at least one drill guide passage (32) passing therethrough. Applicant prefers to ensure that the drill guide passage will not be damaged by the mechanical action of the drill bit as the instant invention is being used to drill dowel pin guide holes into a work piece. Applicant believes that the instant invention will have a longer useful life if all drill guide passages incorporate a bushing manufactured from a material which can better tolerate the wear and tear which will occur when a rotating drill bit passes through the passages. In the preferred embodiment, these bushings are made of brass, though other strong metals such as steel could be used instead. In the event that bushings are included in the instant invention, the drill guide passages must be enlarged sufficiently to permit the bushing to be press fit therein, and the inner diameter of the bushing must be sufficiently large so as to accommodate the passage therethrough of the rotating drill bit.

I claim:

1. A Horizontally Adjustable Dowel Pin Hole Drilling Guide comprising;
   A. a stable piece,
   B. swingable and pivotable connector means,
      I. the swable and pivotable coector means being swingably connected to the stable piece,
   C. a horizontally movable piece,
      I. the horizontally movable piece having at least one drill guide passage passing therethrough for drilling dowel pin holes into work pieces along various horizontal planes,
      II. the horizontally movable piece being pivotably connected to the swingable and pivotable connector means.

2. A Horizontally Adjustable Dowel Pin Hole Drilling Guide comprising;
   A. a stable piece,
      I. the stable piece having a radiused surface,
      II. the stable piece having a first swingable and pivotable connector means attachment hole and a second swingable and pivotable connector means attachment hole, B. a first swingable and pivotable connector means,
  I. the first swingable and pivotable connector means having a first hole and a second hole passing therethrough,
  II. the first swingable and pivotable connector means being swingably connected to the stable piece by a second swingable and pivotable connector attachment means,
    i. the second swingable and pivotable connector attachment means passing through the first swingable and pivotable connector first hole and into the second swingable and pivotable connector means attachment hole,
C. a second swingable and pivotable connector means,
  I. the second swingable and pivotable connector means having a first hole and a second hole passing therethrough,
  II. the second swingable and pivotable connector means being swingably connected to the stable piece by a first swingable and pivotable connector attachment means,
    i. the first swingable and pivotable connector attachment means passing through the second swingable and pivotable connector means first hole and into the first swingable and pivotable connector means attachment hole,
D. a horizontally movable piece,
  I. the horizontally movable piece having at least one drill guide passage passing therethrough,
  II. the horizontally movable piece having a radiused surface,
  III. the horizontally movable piece having a third swingable and pivotable connector means attachment hole,
  IV. the horizontally movable piece having a fourth swingable and pivotable connector means attachment hole,
  V. the horizontally movable piece being pivotably connected to the first swingable and pivotable connector means by a fourth swingable and pivotable connector attachment means,
    i. the fourth swingable and pivotable connector attachment means passing through the first swingable and pivotable connector second hole and into the fourth swingable and pivotable connector means attachment hole,
  VI. the horizontally movable piece being pivotably connected to the second swingable and pivotable connector means by a third swingable and pivotable connector attachment means,
    i. the third swingable and pivotable connector attachment means passing through the second swingable and pivotable connector second hole and into the third swingable and pivotable connector means attachment hole.

3. A Horizontally Adjustable Dowel Pin Hole Drilling Guide comprising;
A. a stable piece,
  I. the stable piece having a radiused surface,
  II. the stable piece having a first right angle cut out area,
  III. the stable piece having a first swingable and pivotable connector means attachment hole located in the first right angle cut out area,
  IV. the stable piece having a second right angle cut out area,
  V. the stable piece having a second swingable and pivotable connector means attachment hole located in the second right angle cut out area,
B. a first swingable and pivotable connector means,
  I. the first swingable and pivotable connector means having a first hole and a second hole passing therethrough,
  II. the first swingable and pivotable connector means being swingably connected to the stable piece by a second swingable and pivotable connector attachment means,
    i. the second swingable and pivotable connector attachment means passing through the first swingable and pivotable connector first hole and into the second swingable and pivotable connector means attachment hole,
C. a second swingable and pivotable connector means,
  I. the second swingable and pivotable connector means having a first hole and a second hole passing therethrough,
  II. the second swingable and pivotable connector means being swingably connected to the stable piece by a first swingable and pivotable connector attachment means,
    i. the first swingable and pivotable connector attachment means passing through the second swingable and pivotable connector means first hole and into the first swingable and pivotable connector means attachment hole,
D. a horizontally movable piece,
  I. the horizontally movable piece having at least one drill guide passage passing therethrough,
  II. the horizontally movable piece having a radiused surface,
  III. the horizontally movable piece having a first radiused cut out area,
  IV. the horizontally movable piece having a third swingable and pivotable connector means attachment hole located in the first radiused cut out area,
  V. the horizontal movable piece having a second radiused cut out area,
  VI. the horizontally movable piece having a fourth swingable and pivotable connector means attachment hole located in the second radiused cut out area,
  VII. the horizontally movable piece being pivotably connected to the first swingable and pivotable connector means by a fourth swingable and pivotable connector attachment means,
    i. the fourth swingable and pivotable connector attachment means passing through the first swingable and pivotable connector second hole and into the fourth swingable and pivotable connector means attachment hole,
  VIII. the horizontally movable piece being pivotably connected to the second swingable and pivotable connector means by a third swingable and pivotable connector attachment means,
    i. the third swingable and pivotable connector attachment means passing through the second swingable and pivotable connector second hole and into the third swingable and pivotable connector means attachment hole.

* * * * *